Sept. 20, 1938.                G. B. COMBARETTE                2,130,733
                            LINEN FOLDING MACHINE
                         Filed Feb. 8, 1936          9 Sheets-Sheet 1

INVENTOR:
Gervais. Benoit. Combarette
BY Haseltine, Lake & Co.
ATTORNEYS

Sept. 20, 1938.　　　G. B. COMBARETTE　　　2,130,733
LINEN FOLDING MACHINE
Filed Feb. 8, 1936　　　9 Sheets-Sheet 3

Inventor
GERVAIS BENOÎT COMBARETTE
By Haseltine, Lake & Co.
Attorneys

Sept. 20, 1938.    G. B. COMBARETTE    2,130,733
LINEN FOLDING MACHINE
Filed Feb. 8, 1936    9 Sheets-Sheet 4

Inventor
GERVAIS BENOÎT COMBARETTE
By Haseltine, Lake & Co.
Attorneys

Sept. 20, 1938.　　　G. B. COMBARETTE　　　2,130,733
LINEN FOLDING MACHINE
Filed Feb. 8, 1936　　　9 Sheets-Sheet 5

Inventor
GERVAIS BENOÎT COMBARETTE
By Haseltine, Lake & Co.
Attorneys

Sept. 20, 1938.  G. B. COMBARETTE  2,130,733
LINEN FOLDING MACHINE
Filed Feb. 8, 1936   9 Sheets-Sheet 6

Inventor
GERVAIS BENOÎT COMBARETTE
By Haseltine, Lake & Co.
Attorneys Sept. 20, 1938. G. B. COMBARETTE 2,130,733
LINEN FOLDING MACHINE
Filed Feb. 8, 1936 9 Sheets-Sheet 8

INVENTOR:
Gervais. Benoit Combarette
BY Haseltine, Lake & Co.
ATTORNEYS

Sept. 20, 1938.     G. B. COMBARETTE     2,130,733
LINEN FOLDING MACHINE
Filed Feb. 8, 1936      9 Sheets-Sheet 9

INVENTOR:
Gervais. Benoit Combarette
Haseltine, Lake & Co.
ATTORNEYS

Patented Sept. 20, 1938

2,130,733

UNITED STATES PATENT OFFICE 2,130,733

LINEN FOLDING MACHINE

Gervais Benoit Combarette, Thizy, France

Application February 8, 1936, Serial No. 62,959
In France February 9, 1935

4 Claims. (Cl. 223—37)

The present invention relates to folding machines for linen articles, and especially undergarments, of the type in which the article to be folded is subjected to the action of at least one group of plates or boards adapted to pivot either longitudinally or transversely, this article being subsequently conveyed, without being manually handled, to a storing place.

The object of the present invention is to provide a machine of this kind which is better adapted to meet the requirements of practice.

According to an essential feature of the present invention, trays, plates or boards are provided which are adapted to pivot longitudinally and laterally and are combined with a modeling frame adapted to oscillate longitudinally, in such a way that two pivoted trays driven from the main shaft and adapted to rotate sidewise successively fold up the lateral portions of the article and that a frame adapted to oscillate longitudinally, driven from the main shaft, through a system of cams and links and disposed in line with the modeling frame, folds up one end of the linen article; upon which, after the parts have come back to their open position, the modeling frame, which, up to this time, had been secured in position, is released either manually or automatically and brought, for instance by means of springs, into the final position, in which the folded linen article is ejected and eventually inserted into a protective envelope.

Other features of the present invention will result from the following detailed description of a specific embodiment thereof.

A preferred embodiment of the present invention will be hereinafter described, with reference to the accompanying drawings, given merely by way of example, and in which.

According to the invention, the centring device is provided with a fixed shoulder $a$ the top-par of which is almost level with the table $b$ on which is put the shirt to be folded $c$.

This centering-device further includes two small movable shoulders $d$ and $e$. Both of the movable shoulders $d$ and $e$ are situated at the end of levers $f$, $g$ oscillating respectively in $h$ and $i$ and the other ends of which are articulated in $k$ and $l$ at the end of the two small links $m$ and $n$. In turn, these small levers have their other ends articulated in $o$ on a movable rod $p$.

Figure 1:
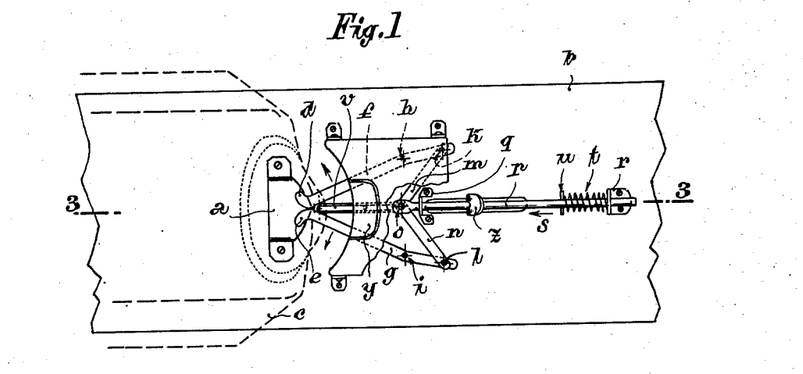
Figs. 1 and 2 are plan views showing the apparatus before and after centring respectively, supposing the folding table taken out.
Figure 2:
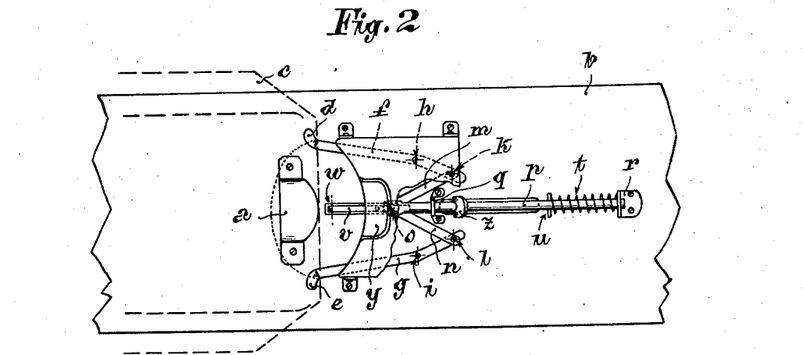
Figure 3:
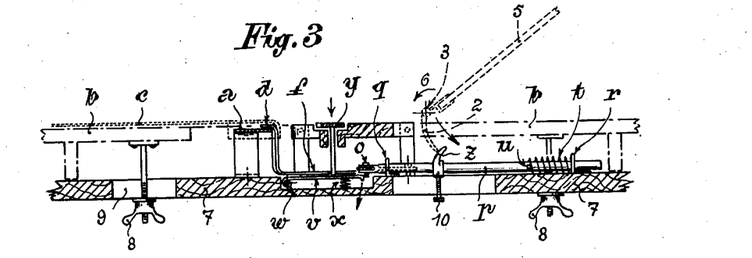
Fig. 3 is a section along 3—3 of Fig. 1.

As shown by Figs. 1 to 3, when the rod $p$ is moved lengthwise, the vertical branches of the levers $f$ and $g$ which bear shoulders $d$ and $e$ respectively, are either moved toward each other or away from each other.

In order automatically to produce this automatic movement, I may use the following arrangement.

The rod p, the movement of which is guided by the slide bars q and r, is under the action of a counter spring t, acting in the direction of the arrow s. One end of this spring has its support on the rod in u and the other end on the slide bar r.

The action of this spring tends of course to open the legs f and g bearing respectively the shoulders d d and e which, thus, are moved away from each other. In order to keep them near each other, as shown in Fig. 1, it is sufficient to compress the spring t and thus to keep the rod p pushed back by means of any abutment whatever. This abutment may be the end of arm v articulated in w and under the action of a spring x which tends to lift it up, so that its end can lock in a suitable way an abutment provided for such purpose at the lower part of rod p.

In the instance chosen and described, it is the lower end of the axle o which acts as this abutment.

In order to produce the disengaging of the system, it is just necessary to move down the lever v by depressing it by push-button y the bottom of which bears thereon.

The setting in the starting position can be obtained mechanically, for instance by means of a buffer z fastened on the rod p and driven by means of a side pin 2 suitably fastened and directed on the axle 3, around which the shirt folding mould revolves.

The centring device can be used in the following way:—

The shirt to be folded c is spread, the back being on top on the table b of the machine, taking care that the shoulders a, d and e (Fig. 1) be covered by the shirt collar previously buttoned. On pressing on button y, the expansion of the spring p causes the opening of the branches f and g and the catching around the shoulders a, d and e of the shirt collar (Fig. 2). It is then sufficient to pull the opposite end of the shirt to spread it correctly on the machine-table. Should this device be fitted on a machine provided with a folding mould 5 turning around an axle 3, the rotary movement in the direction of the arrow 6 which turns it down on the back of the shirt, would start the device, that is to say, would push back the buffer z of the rod p and thus bring nearer to each other the movable shoulders d and e.

Once the folding has been done, it is quite easy to take the shirt off and put another one in its place the device being ready to work again.

The whole of the device can be supported by a small board 7, movable with regard to the table b, so that it is possible to set the centring shoulders a, d and e with regard to the axle 3 of the mould according to the length of the article being folded.

This adjustment is made possible by loosening the set screws 8 which, through the grooves 9, ensure the fastening of the small board 7 to the table b.

It is also with a view to permitting or adjusting its position on the rod p that the buffer z is fastened on it by means of a screw 10.

The shirt well centred and stretched being so arranged, with the shirt front underneath, on the table b, the sleeves are folded up by hand on the sides of the shirt body, either lengthwise, or by a fold, so that the ends of the sleeves be near the shirt collar. This being done, the modeling-tray 5 is put on the back of the shirt in using for said purpose the handle 93. The modeling-tray 5 is kept in this pressed down position illustrated in Fig. 14, by a ratchet 47 which clicks into sector 4 fixed on the axle 3 of the modeling-tray 5.

Figure 13:
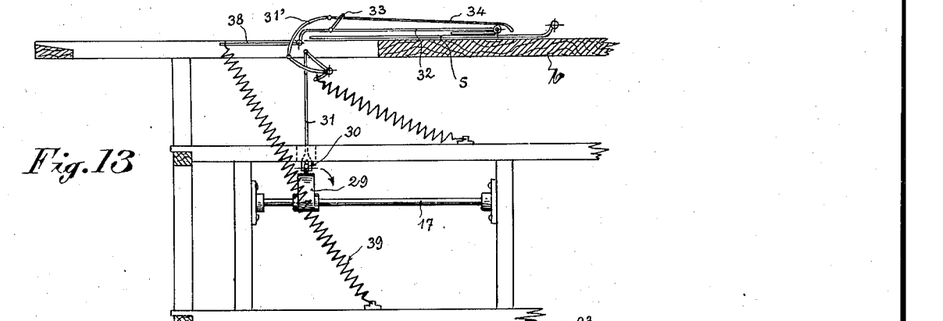
Figure 14:
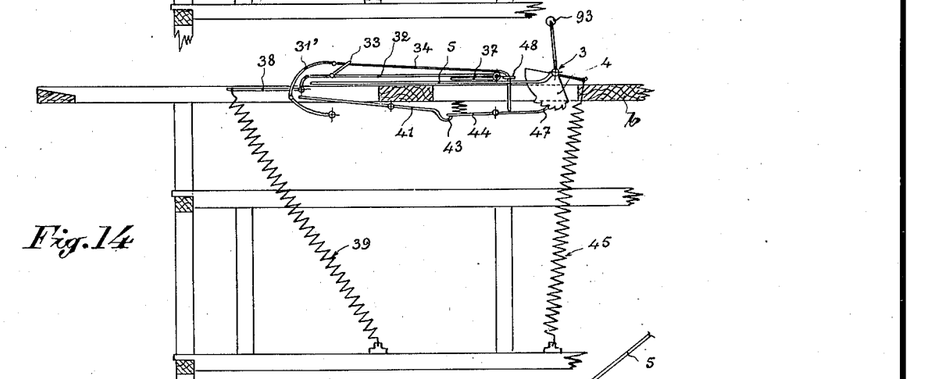
Figs. 14 and 15 are similar longitudinal sectional views which show the drive-mechanism of the automatic movement of the modeling-tray.
Figure 15:
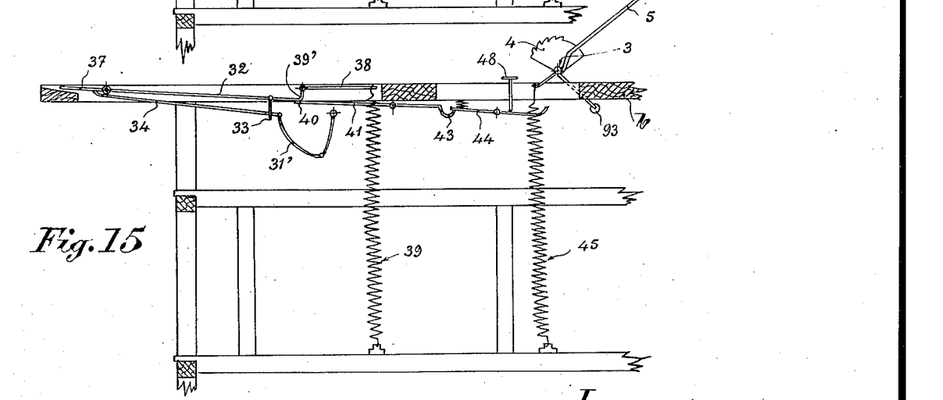

In the position illustrated by Fig. 13, the modeling tray 5 is located between table b and frame 32. The shirt is wholly folded around the modeling tray. After folding, the modeling tray 5 assumes the position shown by Fig. 13. As soon as the frame 32 has come back into the position shown by Fig. 15, the hook 47 is automatically or manually lifted out of the teeth of sector 4. From this time on, the modeling tray 5 can turn about its axis 3, as shown by Figs. 14 and 15.

Figure 9:
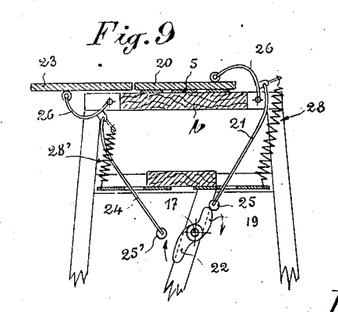
Figs. 9 and 10 are transverse fragmentary sections disclosing the mechanism of the pressing-down side-tray-drive.
Figure 10:
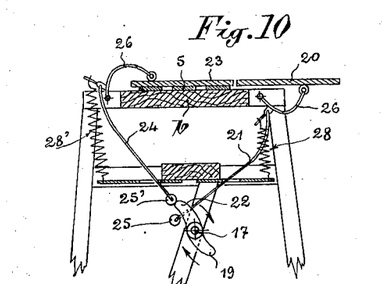

The folding mechanism can then be started by means of the treadle 56. A depressing of this treadle produces, first, the lifting of the bolt 57 on account of the traction transmitted to it by the cable 58 fastened to its lever. The handwheel 59 is thus freed and, when keeping on depressing the treadle, a rotary movement is given, by means of a chain 60 to the cog-wheel 11 and to the shaft 12 on which it is set. A ratchet-pinion 13, or any other means, prevents the shaft 12 and the parts fastened thereto to turn in the opposite direction, either occasionally, or at the coming back of the treadle. On the shaft 12 is set another toothed gear 14, that transmits, by means of a chain 15 and of the wheel 16, the rotary movement to the shaft 17 on which are fixed the different individual driving-cams of the various movements. The cam 18 situated at the end of the shaft is used to keep the bolt 57 lifted during the whole folding-operation. The cam 19 drives the side pressing down tray 20 by means of the rod 21 and the cam 22 drives the side pressing down tray 23 by means of the rod 24. Both cams 19 and 22 are shifted apart on the shaft 17, in such a way that they cause the pressing down trays 20 and 23 to work immediately one after the other. As shown in Figs. 9 and 10, the rods 21 and 24 which respectively produce the pressing down of the trays 20 and 23, carry at their lower end a roller 25, 25' and are articulated at their upper part to a lever having the bowed shape of an arc 26 and the other end of which, engages, by means of a stud, in a slide-bar 27 fastened on the lower face of the pressing-down tray. In this way, each one of the side pressing-down trays is lifted up as soon as the respective rod 21 or 24 is pushed back by the corresponding cam 19 or 22.

The Fig. 9 represents the pressing down system with the first tray 20 lowered, the other being yet in its position of rest; Fig. 10, the tray 20 has come back to its position of rest and the second one 23 is lowered. The hinges 140 of the pressing down trays 20 and 23 are covered by the modeling tray 5 when the latter is swung down for the folding of the shirt. Notches 141 are provided in the tray 5 for affording passages for the parts 142 of the hinges 140. It follows that, when rotating, the pressing down tray, the internal face of which is partly provided with small teeth or projections so as to catch the fabric, therefore pulls the edges of the front part of the shirt. This is due to the fact that, in order to fold back these edges toward the inside, it compels the fabric to turn about, and surround, the lateral edges 143 of the modeling tray 5 when the internal edges 144 of the pressing down trays 20 and 23 come into the positions 145 indicated in dotted lines in Fig. 4. In this way, creases in the shirt-front are avoided.

When the roller 25 or 25' has gone beyond the more eccentred part of its respective cam, the pressing down tray being no longer raised, will return automatically to its resting position under the action of the spring 28, or respectively 28', fastened to the lower part of lever 26.

Figures 4, 5, 6:
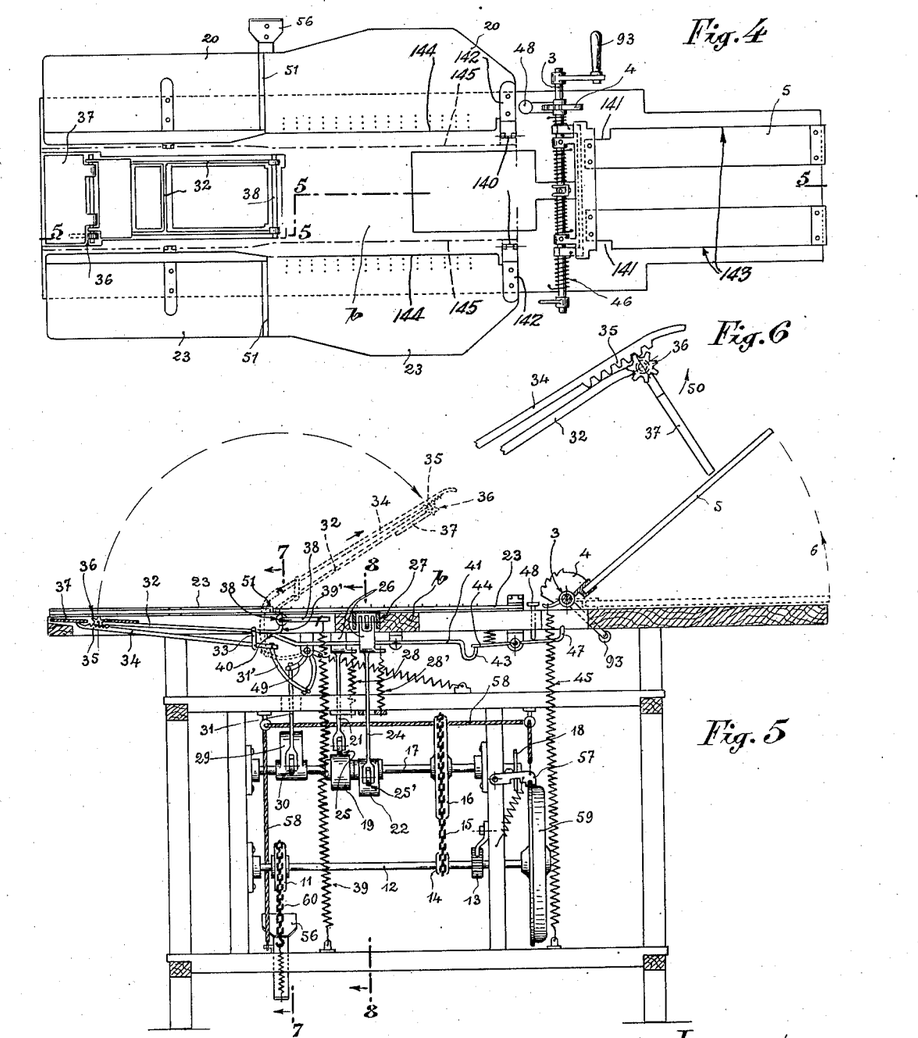
Fig. 4 is a plan view of the folding apparatus for shirts in its idle or off position without any centring-device omitted shown associated therewith.
Fig. 5 is a longitudinal section of the machine along the line 5—5 of Fig. 4, the modeling-tray having been lifted up.
Fig. 6 is a fragmentary side-view, on an enlarged scale, showing the drive of the small board used to press down the shirt-skirt.
Figure 7:
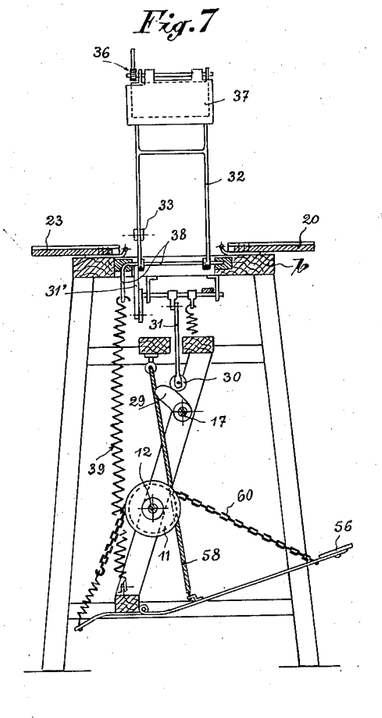
Fig. 7 is a transverse section along 7—7 of Fig. 5, the movable back-tray being in raised position, and the pressing-down side-trays having been lowered into idle position.
Figure 8:
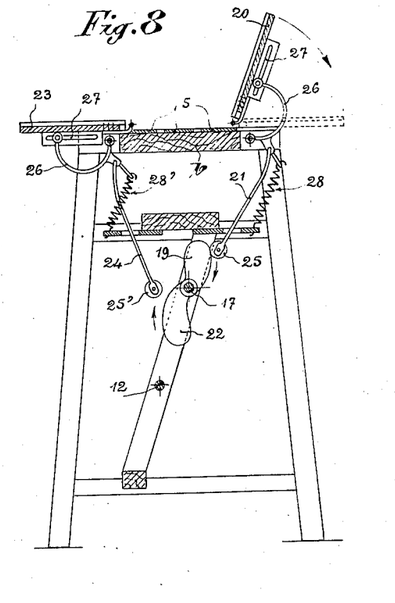
Fig. 8 is another transverse section along 8—8 of Fig. 5, with one pressing down side tray lowered and the other lifted up.

The shirt having thus been folded in three parts in its width it is then necessary to fold it lengthwise. So as to avoid an intricate drawing and make its reading easier, the orientation of the axle 17 with respect to its visible and normal position has been displaced by 90° (Fig. 5). For this purpose, at the back of the table, beyond the mould 5, there is a tray or a movable frame 32. This tray or frame is driven by a cam 29 fixed on the same shaft 17 as the other cams 19 and 22 (Fig. 5). It drives the mechanism which starts the frame 32 by means of the roller 30 situated at the end of the rod 31 and a system of articulated levers 49, 31', 33 and 34 more especially visible in Figs. 11 and 12.

When the rod 31 is pushed upwards, at the beginning of its stroke, it exerts a pressure, by means of the links 31' and 33, on the rod 34 the end of which is provided with a rack 35 (Fig. 6) with which the pinion 36 set on the axle of the movable plate 37 meshes. As a consequence of this, this plate 37 is pressed down towards the inside in folding the shirt skirt. Going on with its upward movement, the rod 31 causes the turning round, by means of the small connecting-rod 33 of the movable frame 32 which revolves around the axle 38 and comes down on the moulding-tray 2, on which it applies the shirt completely folded (Fig. 13).

As before, for the longitudinal foldings, it is necessary to have the shirt-front creases disappear. For this purpose, the frame 32 has a bent part 39' which, revolving round its axle 38, increases the cloth tension.

At this moment, the roller 30 having left the cam 29, the movable frame 32 returns while turning in the direction of the arrow under the action of the return spring 39 and again assumes its initial idle position.

At the beginning of this return movement of the frame 32, on account of its weight, the plate 37 turns in the direction of the arrow 50 (Fig. 6) and, setting itself free from underneath the shirt-skirt, causes gradually the prolongation of said frame 32.

As shown by Figs. 4, 6, 14 and 15, at the end of this movement, one of the bent parts 39' of the frame 32 comes in contact with the end 40 of the lever 41 and presses it downwards, so that the other end 43 of the lever 41 lifts the lever 44 up and sets the ratchet 47 free from the sector 4, so that the modeling-tray 5 comes back under the action of spring 45 which, previously stretched when pressing down occurred on the back of the shirt, cause it to turn in the opposite direction to that of the arrow 6 in order to bring it back automatically in the initial starting position shown in Fig. 4. This automatic action can be suppressed by means of a control member. In this case, the ratchet 47 is set free in pressing on the tappet 48.

To make use of this machine, the procedure is as follows:—

The shirt being stretched and correctly centred on the table, the shirt-front being underneath, the sleeves are put in their place and the modeling-frame 5 is pressed down on its back.

Successively, one folds then lengthwise each one of the sides by means of a small articulated board which stretches at the same time the front of the shirt so as to make the creases disappear.

This having been done, by means of the articulated movable frame, the shirt-skirt is folded on itself, and is then folded in two with respect to its length around the modeling frame 5 which is thereafter returned at last so as to bring the shirt-front uppermost.

The modeling tray 5 may be turned manually by means of the cranked handle 93. When its operation is to be automatic, a spring is then used for this purpose.

In this case, I provide for instance about the spindle 3 of the modeling frame 5 coil springs 46, 89, 90, the ends of which bear on the one side upon the table b and on the other hand upon the pressure member 88. When the latter has been turned in the direction of arrow 6 (Fig. 5), these springs 46 are tensioned. If the pawl 47 is then moved out from between the teeth of the sector 4, the springs bring back the modeling tray 5 out of the positions illustrated by Figs. 11 to 14, inclusive. In the course of this movement, the modeling tray 5 carries along the shirt c, folded around it, as shown by Fig. 15.

In addition to the essential elements above described the pressing down trays 20 and 23 are provided with surface projecting ridges 51 used to mark beforehand the fold along which the transverse folding will subsequently be done.

As, during the folding, it may be necessary from time to time to iron the linen, appropriate devices ensure, at the required moment, the momentary stopping of the shaft 17 which bears the cams when the folding is wholly automatic.

The ejector device (Fig. 19) is formed by an ejector part 61, which, in the method described is set in the middle of the modeling-tray 5, between the two plates 62 and 63 of the latter, the spacing of which can be regulated.

The frame of the modeling-tray has been provided with slide bars 66, 67, 68 and 69 enabling to fix the plates 62 and 63 with a variable spacing, according to the width of the article to be folded.

Figure 11:
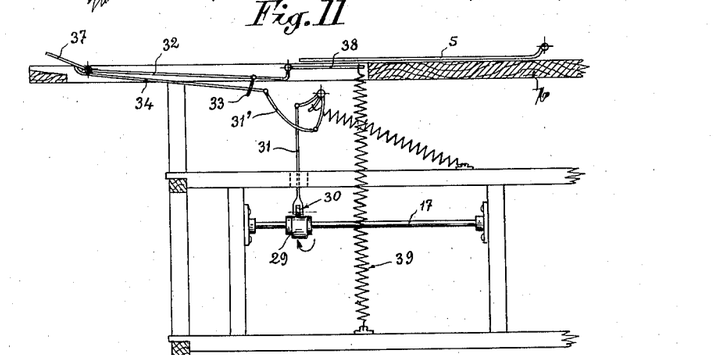
Figs. 11, 12 and 13 are longitudinal fragmentary sections showing the drive-mechanism of the movable tray and small board used to press the shirt-skirt down, the direction of the movement-drive axle having been displaced by 90°.
Figure 12:
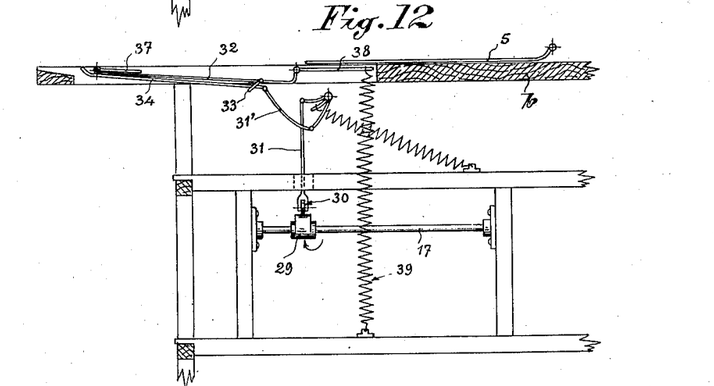

The modeling-tray, after the folding, is in the middle of the shirt to be ejected and of course will carry it away in its movement when it is moved by the mechanism hereinafter described for bringing it from the position shown by Fig. 11 into that shown by Figs. 17 and 19. This part 61 is guided in its course, for instance, by the roller 70 which engages in the central slide bar 71 and by two side rollers 72 and 73 placed end to end. A cable 74 pulled by an automatic rolling-device 75 brings back the ejector part 61 after the ejection has taken place.

Figure 16:
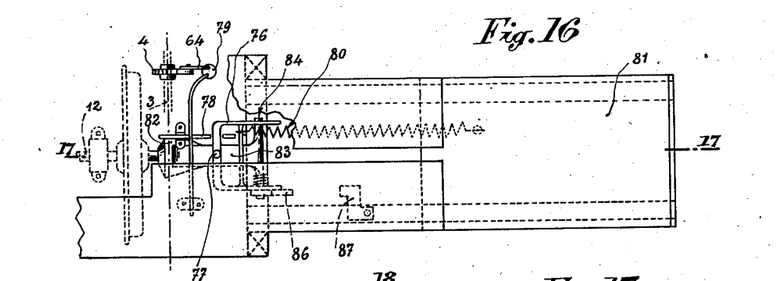
Fig. 16 is a plan view of the ejector-device fitted on a shirt-folding machine.

The mechanical system of ejection properly so called contains a rectangular frame 76, at the top of which is placed a driving rod 77 which is used to throw the ejector part 61. This frame 76 is kept in the working position by a hook 78 which can be depressed, so as to set the frame free, by pressure on a button 79. This operation can be made either by hand, or, preferably mechanically, by means of any appropriate mechanism, for instance a tappet 64 fixed in the toothed sector 4 used to stop the modeling-tray 5. When the hook 78 is depressed as said hereabove, the release spring 80 pulls abruptly the frame 76 forward and the driving rod 77, which is guided in its course by the central slide bare 71 gives an abrupt forward movement to the ejector part 61 which is cast forward, carrying the folded shirt or any other article away and lays it down on a small board 81 at the end of the linen-folding machine. In the case represented by Fig. 16, the ejector being thrown out of gear before that the modeling-tray 5 is completely pressed down, the ejector 61, which from the driving rod 77 receives an impulsion movement, receives also a certain acceleration from the centrifugal force evolved by the pressing down of the modeling-tray 5.

The ejection being over, the driving-gear rod 77 is brought forward in the following way, for instance. The shaft 12 on which the handwheel 9 of the shirt-folding machine is set is extended and bears a helicoidal screw 82 having a barrel shape. The frame 76 bears a hook 83 the axle of which 84 can turn round on its vertical pieces; a spring 85 fastened to the axle 84 tends to keep the hook 83 lowered down, but a spring tappet 86 prevents the lowering of the hook 83 while the ejection takes place. When said ejection is over and when the frame 76 drawn forward by the release spring 80 is at the end of its stroke, the spring tappet 86 knocks a buffer 87 which will lower it down momentarily thus setting the hook 83 free and the latter under the action of its spring 85 will go down and engage in the helicoidal toothwork of the screw 82, that will bring it back with the frame 76 bearing the driving rod 77 pertaining to the ejector device 61. When the hook 83 comes to the end of the helicoidal screw 82, the frame 76 is stopped again by the hook 78 and the ejector is ready to work. By said movement the hook 83 is also ready by means of the pawl fastened on its axle and the spring tappet 86, so that the hook 83 will not fall again on the screw 82 when the driving-rod 77 will be let free.

The ejector device is completed by a pressure system situated underneath and at a small distance from the modeling-frame 5 to prevent the linen from unfolding. It is well known that after the linen-folding the modeling-tray is generally pressed down and it describes a circle-arc of 180°; when it has gone beyond the vertical-line, the linen would unfold if it was not kept down firmly pressed on the tray by a suitable device. Said device consists, for instance of a fork 88 with two legs set on the same axle 3 as the modeling-tray 5 but rather loose with respect to it. Two spiral-springs 89, 90 operate the two ends 91, 92 and tend to keep this fork upright. When the modeling-tray 5 comes to that position, the fork 88 applies on the linen article and keeps it down until the ejection takes place, without hindering same, on account of the very little stress it opposes to it.

Figures 17, 18, 20:
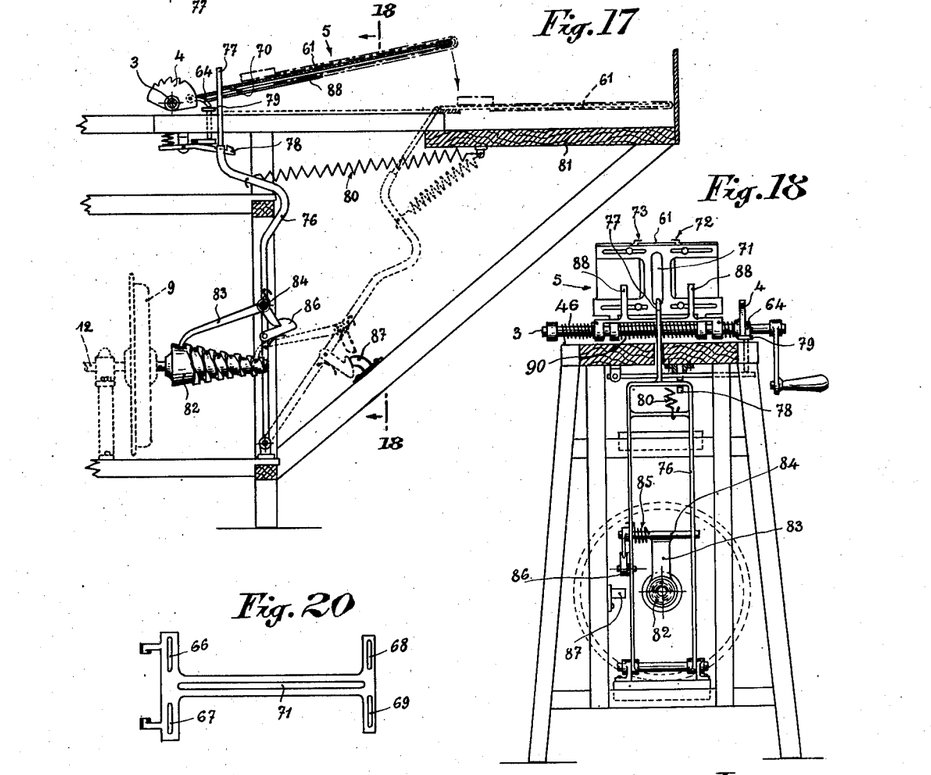
Fig. 17 is a fragmentary section along line 17—17 of Fig. 16; showing the ejection movement properly so called which drives the ejector-tray.
Fig. 18 is a vertical sectional view taken along 18—18 of Fig. 17.
Fig. 20 is a plan view of the frame of the modeling tray.
Figure 17A:
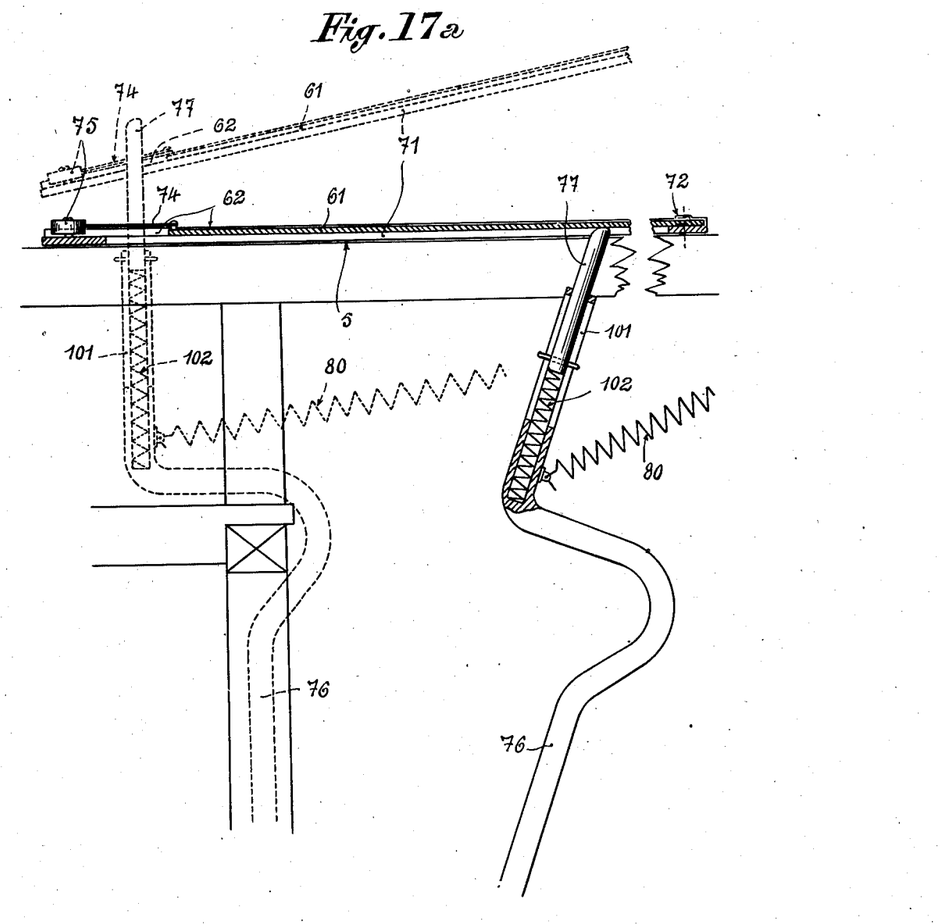
Fig. 17a shows on an enlarged scale a detail of Fig. 17.

Fig. 17a shows an embodiment of the construction of the end of the rod controlling the ejecting member 61, as shown by Fig. 17.

The arm 76 is provided at its end with a sleeve 101 on the inside of which is slidably mounted a rod 77 which is constantly urged outwardly by a spring shown at 102.

Figure 19:
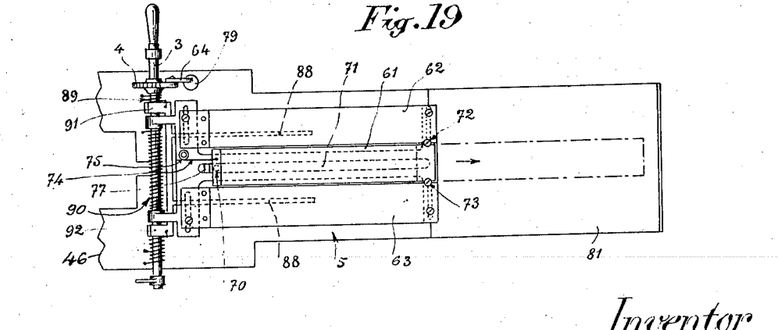
Fig. 19 is a partial plan view of the machine, when the modeling-tray has been turned down.

When nearing the end of its stroke, as shown in dotted lines by Figs. 17 and 19, the ejecting member is moved backward by the cable 74 and its automatic winding device 75, into the position illustrated by Fig. 19.

At the beginning of its return movement, so as to come into the position shown in solid lines, the end of the rod 77 comes into contact with the ejecting member 61. Under this action, the rod 77 is driven into the tube 101, so as not to interfere with the return movement of the arm 76.

At the end of the stroke, as shown by Figs. 17 and 19, the end of the rod 77 comes into the position shown in solid lines.

When coming opposite the aperture visible on Fig. 19, the rod 77 pushed by the spring 102 moves out from the tube 101 and comes back into the normal position behind the ejector device, as shown by Fig. 17.

In Figs. 21 to 25, a machine is shown which has several alterations included in the embodiment of the centring device, such as a drive by electrical motor of most of the movements and grooved-cams instead of cams with a roller-rod, the rollers being maintained against the cams by means of springs.

An alteration made in the construction of the centring device applies to the system driving the movement of legs $f$ and $g$ and their return to starting position.

Figure 21:
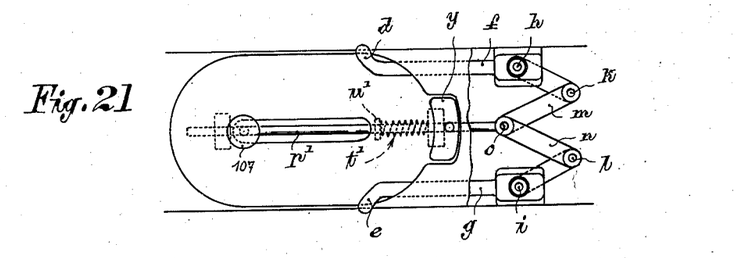
Figs. 21 and 22 are a plan view, respectively, and a vertical view of a modified centring device.
Figure 22:
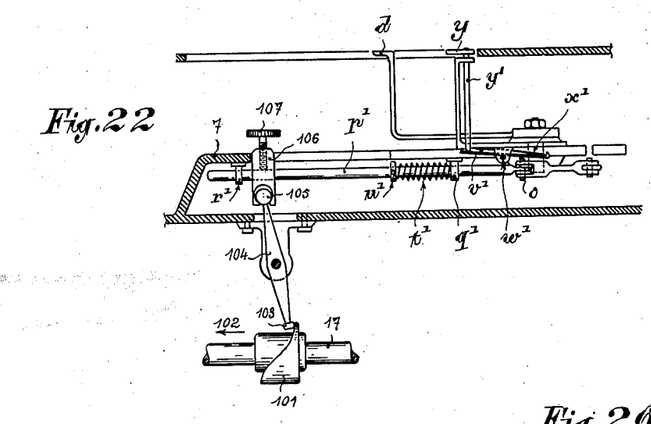

For this purpose, two small connecting-rods $m$ and $n$ have their mutual point $o$ articulated on a movable rod $p^1$ going through guide brackets $q^1$ and $r^1$ joined to the frame 7. The spring $t^1$ having its bearing on one side against bracket $q^1$ and on the other against the buffer $u^1$ held up by the rod $p^1$ tends of course to spread the shoulders $d$ and $e$ outwardly, as shown by Figs. 21 and 22. These shoulders are held close to each other when the end of spindle $o$ comes into abutment with the end of lever $v^1$, pivoted at $w^1$ and which is urged into contact therewith by a spring $x^1$. This return to the initial position is obtained through the action of a cam 101 operatively connected with the driving shaft 17. The rotation of this cam moves in the direction of arrow 102, the end 103 of a lever 104 movably connected to rod $p'$ by ball joint 105. The releasing of the system is obtained as before by manually pushing down the driving button $y$, which has a pendent foot $y^1$ resting on the opposite end of lever or latch $v^1$, resulting in the release of said latch.

When screw 107 has been loosened, part 106 makes it possible to move its point of fixation along rod $p^1$ when, in order to adjust the folding length of the shirt, the whole of the centering device of the modeling tray is shifted or adjusted along rod $p^1$ to the desired extent.

Figure 23:
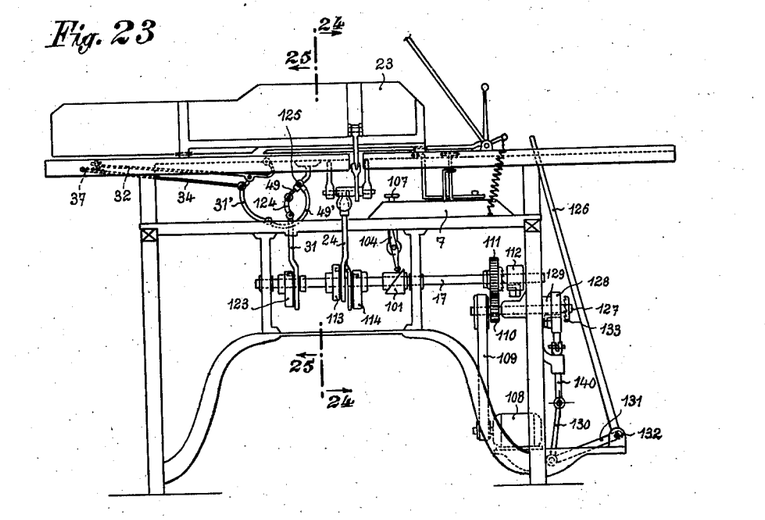
Fig. 23 is a vertical side view of an apparatus with electric driving means.
Figure 24:
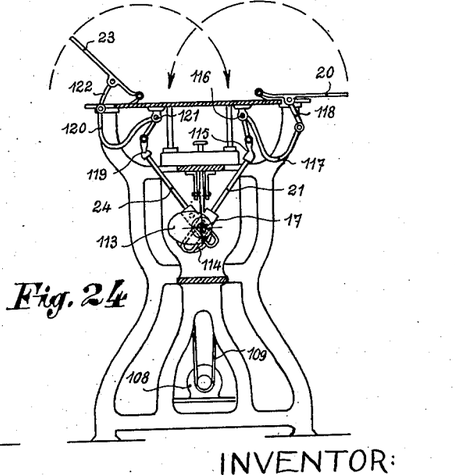
Figs. 24 and 25 are transverse sections along lines 24—24 and 25—25, respectively, of Fig. 23.
Figure 25:
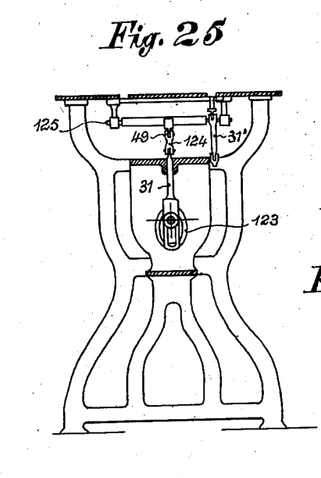

The machine shown in Figs. 23 to 25 is different from the one described in Figs. 4 to 20, for the following reasons:—

An electrical motor, 108, for instance, working continuously, drives, by means of a strap 109 and a cog-wheel 110, another cog-wheel 111 which is loose on shaft 17. A coupling-device 112, described herebelow, permits at any time wanted to drive the shaft 17 and have it accomplish the single necessary revolution for accomplishing a complete folding of the shirt. It should be stated that a single rotation of shaft 17 is sufficient for folding the shirt and this shaft carries all the cams driving the various rods that cause the motions of the parts resulting in the folding.

This shaft 17 moreover bears, apart from the cam 101 starting the centring-device, Two grooved cams 113 and 114 shifted apart so as to drive, successively and respectively the side pressing down trays 20 and 23 by means of the rods 21 and 24 bearing on their lower ends the guide rollers moving into the grooves of said cams 113 and 114.

The rectilinear displacement of rod 21 causes the pressing down of the tray 20 by means of link 115 oscillatory in 116, joined to link 117 having the same oscillatory axle, and articulated to the small connecting-rod 118 articulated on its other end to tray 20.

The pressing-down of trays 23 is obtained by the rod 24 by means of the links 119 and 120 turning round in 121 and the small connecting-rod 122.

Another cam 123 suitably fastened on the same shaft 17 allows the shirt to be folded crosswise already folded lengthwise. Through rod 31, the lower extremity of which is joined to a roller rolling in its groove, this cam 123 causes the pressing down of the plate 37 and then of the frame 32. For this purpose, the rod 31 pushes the small connecting-rod 124 articulated as well to lever 49 oscillatory in 125 and pushing by means of its arm 49' the small connecting-rod 31' which drives the link which is articulated to it.

The folding movement is done as described for the first type of operation of the machine.

The mechanical drive for this type of machine includes a driving rod 126 which is used to operate the injector part 61.

For this purpose, on the shaft 127 continuously driven from the motor 108 a cam 128 has been loosely mounted and is driven at a desired speed by a coupling device 129 similar to device 112.

When turning round, this cam 128, acting through the rod 140, and the small connecting-rod 130, operates the arm 131 pivoted at 132 and joined to part 126 having the same oscillatory-axis. It is thus evident that the displacement due to the forward and return movement of the ejecting device will be accomplished after a single revolution of the cam 128.

The coupling-devices used in 112 or in 129 so as to cause the revolution of a shaft or a cam during a turning can be any one of the known devices used for this purpose.

Figure 26:
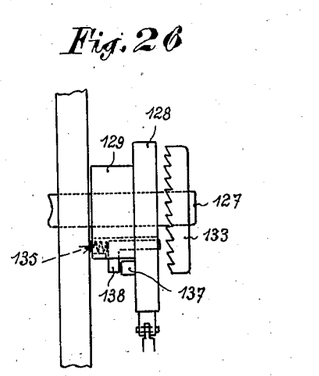
Figs. 26 and 27 are enlarged scale figures, showing profile and plan views, respectively, of a clutch suitable for the driving of any pieces.
Figure 27:
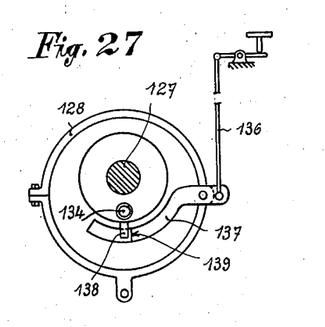

The coupling devices 112 and 129 may be of any suitable type such as, for example the device shown in Figures 26 and 27. In this arrangement the coupling device comprises a ratchet wheel secured to the shaft 127 and a collar 129 mounted loosely thereon. A bolt 134 provided with a finger 138 is mounted in the collar 129 and is biased into engagement with the ratchet wheel 133 by means of a spring 135. The bolt 134 is normally held out of engagement with the ratchet wheel 133 by the engagement of the finger 138 with the end of the pivoted lever 137.

To begin a cycle of operations of the machine the end of the lever 137 is moved downwards by pressure on a push button acting through the rod 136. The spring 135 forces the finger 134 into engagement with the ratchet wheel 133 the rotation of which then rotates the collar 129 and with it the eccentric 128 which in turn rocks the rod 126 through the intermediary of the rods 140, 130 and 131.

When the collar 129 has nearly completed one revolution the finger 138 reaches the end of the lever 137 since the end of this lever is bevelled as indicated at 139 the finger rides up the bevel until it has drawn the finger 134 out of engagement with the ratchet wheel, whereupon the rotation of the collar 129 ceases.

Preferably the machine is provided, near the pivot shaft of the modeling frame and approximately level with the table plane, with a centering device comprising a central fixed shoulder and a pair of movable shoulders each secured to the end of a lever, which levers are coupled one to the other so that under the action of a common force the movable shoulders move simultaneously away from the fixed shoulder.

Such a device has the advantage of ensuring the centering of the article as it is sufficient to start the device to have the collar of, for instance a shirt, firmly held in place by means of the three shoulders which, having been inserted into the opening of the collar spread out and retain the latter at three points. Moreover, it has the advantage of facilitating the preparation of the folds at the back of the shirt because the shirt-front is underneath.

When a shirt is to be folded, the sleeves being put in their normal position, the machine after previous pressing of the shirt between the table and a modeling frame performs the folding effecting the following consecutive operations:

(1) Each side is folded successively in the direction of the length by means of small boards articulated to the table and which, at the same time, stretch the cloth in order to remove the creases.

(2) By means of a double articulated and rotary frame, the small skirt of the shirt is then folded and then the shirt is folded along its length, being pressed down on the modeling frame.

(3) When the double articulated frame has returned to its original position, the modeling frame can also be turned over so as to turn the shirt upside down, with the front of the shirt on top, in order to permit its removal from the machine.

Moreover, this folding machine has a removal device for removing the articles automatically as soon as they are folded, placing them either on a small table provided at the end of the machine, or on any other device provided for their reception.

Manifestly variations may be resorted to and parts may be used without others within the scope of the appended claims.

Having now fully described my invention, I claim:

1. A machine for folding shirts and other textile articles, comprising in combination, a stationary table, a modeling frame for carrying the shirt to be folded, pivotally mounted on a pivot shaft on said table, a pair of side boards articulated to the table and capable of folding the edges of the shirt lengthwise one after the other, a rotatably movable tray in the form of a frame pivoted at one end and articulated adjacent the other end thereof, said tray being capable of folding back upon itself in order to fold and press the skirt of the shirt and of rotating while remaining folded in order to cause the shirt to be folded around said modeling frame, the tray being further capable of a reverse rotary movement effecting the release of the modeling frame and said modeling frame upon being released being capable of turning over in order to invert the folded shirt upon said table, means for actuating said side boards in succession, and means for actuating said tray.

2. A machine according to claim 1, wherein a centering device comprising a central fixed shoulder member is located adjacent to the pivot shaft of the modeling frame approximately level with the plane of the stationary table, and a pair of movable shoulder members, and wherein a pair of levers are coupled together, each lever having one of said movable shoulder members secured upon the end thereof, and said shoulder members being simultaneously shiftable away from said fixed shoulder member.

3. A machine according to claim 1, wherein a receiving member is provided at the end of the machine and a pressure member for retaining the folded shirt or article pressed against the modeling frame after folding and before ejection thereof in order to prevent unfolding of the same, and wherein an ejector device is mounted upon said modeling frame and capable of removing the shirt or other article to said receiving member from the modeling frame, an ejector movement for actuating said ejector device, means causing said pressure member to press the folded article against the pressure member and means for releasing and resetting the ejector movement.

4. A machine according to claim 1, wherein a main drive shaft is provided and the means for actuating the side boards include cams upon said drive shaft and levers cooperating with said cams, and the means for operating the tray comprise an eccentric on said shaft and a member cooperating therewith.

GERVAIS BENOÎT COMBARETTE.